United States Patent [19]

Grimes et al.

[11] Patent Number: 4,898,444
[45] Date of Patent: Feb. 6, 1990

[54] NON-INVASIVE OPTICAL COUPLER

[75] Inventors: Gary J. Grimes, Thornton; Lawrence J. Haas, Broomfield; Jon R. Sauer, Aurora, all of Colo.

[73] Assignees: American Telephone and Telegraph Company, New York, N.Y.; AT&T Information Systems Inc., Morristown, N.J.

[21] Appl. No.: 278,123

[22] Filed: Nov. 30, 1988

[51] Int. Cl.$^4$ ............................................. G02B 6/26
[52] U.S. Cl. ............................ 350/96.15; 350/96.16; 350/96.18
[58] Field of Search ............... 350/95.15, 96.16, 96.20, 350/96.21, 96.22, 96.18

[56] References Cited

U.S. PATENT DOCUMENTS

| 4,021,097 | 5/1977 | McMahon | 350/96.15 |
| 4,087,156 | 5/1978 | Kao et al. | 350/96.21 |
| 4,264,126 | 4/1981 | Sheem | 350/96.15 |
| 4,355,863 | 10/1982 | Aulich et al. | 350/96.15 |
| 4,387,974 | 6/1983 | Marshall et al. | 351/210 |
| 4,682,843 | 7/1987 | Mahlein et al. | 350/96.15 |
| 4,768,854 | 9/1988 | Campbell et al. | 350/96.16 |
| 4,784,452 | 11/1988 | Hodge et al. | 350/96.15 |

FOREIGN PATENT DOCUMENTS

| 2064503 | 7/1972 | Fed. Rep. of Germany. | |
| 58-7120 | 1/1983 | Japan | 350/96.15 |
| 63-163308 | 7/1988 | Japan | 350/96.16 |

Primary Examiner—John D. Lee
Attorney, Agent, or Firm—John C. Moran

[57] ABSTRACT

A non-invasive optical fiber coupler for coupling light into an optical fiber bus through the cladding surrounding the optical fiber bus without bending the optical fiber bus. The coupler comprises a tap optical fiber free end adjacent to and facing a region of straight optical fiber bus with the tap fiber free end and optical fiber bus region encapsulated with a junction media having substantially the same index of refraction as the cladding of the optical fiber bus. Since the bus cladding is not removed nor is the optical fiber bus bent, there is no additional light lost due to the coupler from the optical fiber bus.

15 Claims, 3 Drawing Sheets

NON-INVASIVE OPTICAL COUPLER

TECHNICAL FIELD

This invention relats to an optical fiber coupler for launching a light signal into an optical fiber, and in particular, to a non-invasive optical fiber coupler.

BACKGROUND OF THE INVENTION

Optical fiber buses offer the potential of extremely high bandwidth capability and electromagnetic interference immunity as compared to bus technology based on electrical transmission. Among the problems in prior art optical fiber bus arrangements, however, is a limitation in the number of locations at which light can be introduced into the bus—referred to herein as "tap sites"—this limitation resulting principally from signal strength loss and reliability issues.

In particular, one prior art approach to the coupling of light into the bus is to sever the bus at each tap site and introduce a discrete coupling device between the severed ends. Disadvantageously, misalignment, insertion loss and other effects at each of the two coupler/bus interfaces created by this "invasive" approach inevitably result in significant dissipation of signal strength.

As a result, the art has actively sought to develop other types of optical bus coupling techniques.

For example, in an arrangement disclosed in U.S. Pat. No. 4,768,854, a severe bend is created at each tap site and light is introduced at the bend through the light fiber buffer and cladding. Anothe approach using bends in the fiber removes the buffer and introduces the light directly into the cladding, as shown in Federal Republic of Germany Patent No. 2,064,503.

Moreover, quite a number of prior art approaches remove both the buffer and cladding at each tap site. For example, U.S. Pat. No. 4,021,097 discloses the coupling of an optical fiber with a slab of light promulgating material. The fiber cladding is removed in the coupling region, and the fiber has a negative curvature which leaves the fiber coupling region under tension. U.S. Pat. No. 4,355,863 discloses the bundling of optical fibers in which a portion of the cladding has been removed. U.S. Pat. No. 4,387,974 discloses an evanescent wave coupler in which two optical fibers which have a portion of the cladding removed are juxtaposed with an inter-leaf film between them. The inter-leaf film secures a constant spatial relationship between the fibers to permit evanescent coupling therebetween. U.S. Pat. No. 4,264,126 discloses an optical fiber coupler in which a pair of optical fibers with their cladding removed are braided in tension and then placed in a coupling solution. U.S. Pat. No. 4,087,156 discloses an optical fiber transmission mixer wherein the cladding material is removed from an intermediate region of a plurality of fibers, and the exposed fiber cores are encapsulated in a matching or slightly higher refractive index material. The encapsulated region is then enclosed in a low index sheath to prevent light from escaping from the mixer.

Disadvantageously, many of the above-mentioned and other non-invasive coupling arrangements known in the art give rise to problems in mechanical reliability. Specifically, bending or other forms of physical stress placed on the fiber may create micro-cracks, ultimately leading to a fracture of the optical fiber. In addition, approaches which remove the cladding expose the tap sites to water and other impurities which can accelerate micro-crack propagation. Moreover, bends at no-longer-needed tap sites cannot typically be fully removed and permanent "microbend losses" may result.

SUMMARY OF THE INVENTION

A departure and advancement in the art is achieved by a non-invasive light launcher or injection tap which couples a tap fiber to the cladding of an optical fiber bus or an optical transmission media using a junction media encapsulation material having substantially the same index of refraction as the cladding. Since the index of refraction of the cladding and the encapsulation material are closely matched, the light is transmitted with high efficiency from the encapsulation material through the cladding into the optical fiber bus core. Advantageously, since the cladding is not removed, there is no additional loss from the core at the location of the optical coupler. Additionally, it is not necessary to bend the optical fiber bus at the location of the coupler. Since there is no loss at the tap site, the couplers may be positioned in as close a proximity to each other as desired.

Advantageously, the tap fiber can be parallel with the optical fiber bus thereby coupling only higher order propagating modes into the optical fiber bus from the tap fiber. In addition, the difference between the reflective index of the junction encapsulation material and the refractive index of the optical fiber bus coupling is equal to or less than about 0.1.

In addition, a lens can be attached to the free end of the tap optical fiber for collimating the light transmitted to the junction media which also encapsulates the lens. The lens may be a GRIN type lens and having substantially the same refractive index as the junction media.

Another embodiment of an injunction tap is fabricated by having a cladding extension on the cladding of the optical fiber bus. The cladding extension has a side that interfaces with a transmitter or coupling apparatus for launching light into the optical fiber bus via the cladding. The transmitter has a light source for generating light signals and a collimating lens that is positioned parallel to the side face of the cladding extension. Advantageously, the optical fiber bus is a square fiber, and the cladding extension is positioned horizontally on one face of the optical fiber bus.

DETAILED DESCRIPTION

Figure 1:
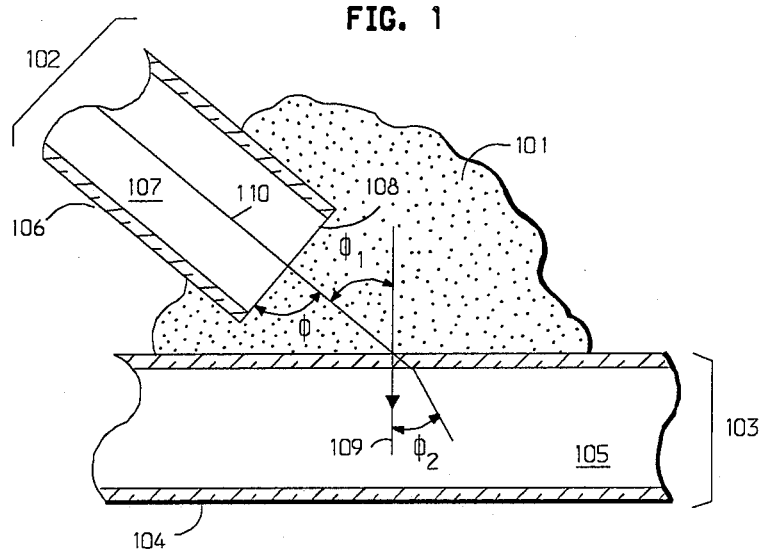
FIG. 1 illustrates a longitudinal cross-section view of a first embodiment of the optical fiber coupler of this invention.

An optical fiber coupler in accordance with the present invention is illustrated in FIG. 1 in a longitudinal cross-section view along a plane parallel to the longitudinal axis of the optical bus fiber 103 and tap fiber 102. Bus fiber 103 has a light-guiding core 105 surrounded by cladding 104. The buffer surrounding the cladding has been removed along the length of bus fiber 103 where the coupler is to be located by using conventional methods for removing the buffer from the cladding. Tap fiber 102 comprises core 107 surrounded by cladding 106. The buffer has been omitted from fiber 102 for clarity. However in normal application, it would extend over the entire outer region of cladding 106. Junction media 101 encapsulates free-end face 108 of tap fiber 102 and a region on bus fiber 103. Junction media 101 rigidly attaches and aligns fiber 102 to bus fiber 103. Junction media 101 has the same or substantially the same index of refraction as cladding 104. In this context, media 101 and cladding 104 are regarded as having substantially the same index of refraction if the difference between their respective index of refraction is less than or equal to 0.1. By having the index of refraction of junction 101 and cladding 104 substantially the same, little power is lost in launching light, illustrated as ray 110, from core 107 through junction media 101 and cladding 104 into core 105. Advantageously, the power loss can be minimized by choosing an optical tap fiber whose core 107 has substantially the same index of refraction as junction media 101 and cladding 104. Advantageously, those conditions are met if core 107 and cladding 104 are fabricated from polymethyl methacrylate (PMMA) and junction media 101 is fabricated from Electro-Lite ELC4481 methacrylate adhesive.

The Fresnel reflection loss of light power as ray 110 exists end-face 108 is given by the following formula:

$$\text{Reflection Loss} = \left( \frac{n_1 \cos\theta - n_2 \cos\theta}{n_1 \cos\theta + n_2 \cos\theta} \right)^2 \quad (1)$$

where $n_1$ is the index of refraction of core 107 and $n_2$ the index refraction for junction media 101. For $\theta = 90°$, equation 1 becomes $$\text{Reflection Loss} = \left( \frac{n_1 - n_2}{n_1 + n_2} \right)^2 \quad (2)$$

If $n_1 = n_2$, the reflection loss computed from equation 2 is zero. However, the reflection loss is small even if $n_1$ does not equal $n_2$. For example, if $n_1 = 1.59$ and $n_2 = 1.49$, the reflection loss is 0.00105. The angle $\phi_2$ at which ray 110 enters core 105 is determined by Snell's law which is as follows:

$$n_1 \sin\phi_1 = n_2 \sin\phi_2 \quad (3)$$

where $n_1$ is the index of refraction of junction media 101 and $n_2$ is the index of refraction of core 105. In order for ray 110 to be launched into fiber 103, angle $\phi_2$ must be greater than the critical angle, $\phi_c$, of optical fiber bus 103. The critical angle is given by:

$$\phi_c = \sin^{-1}\left( \frac{n_1}{n_2} \right) \quad (4)$$

where $n_1$ and $n_2$ are the same as in equation 1.

Light which was injected into optical fiber bus 103 from an upstream tap is not lost at the tap illustrated in FIG. 1. Since the light from the upstream tap typically only penetrates the cladding several wavelengths deep (a few microns), this light is not affected by the existence of the through-cladding launch tap illustrated in FIG. 1 and, in particular, is not attenuated by the through-cladding launch tap. Further, there is no need to bend core 105 to create a tap site, and the bus can be straight. These are important factors when a number of launch taps are placed on optical fiber bus 103.

Figure 2:
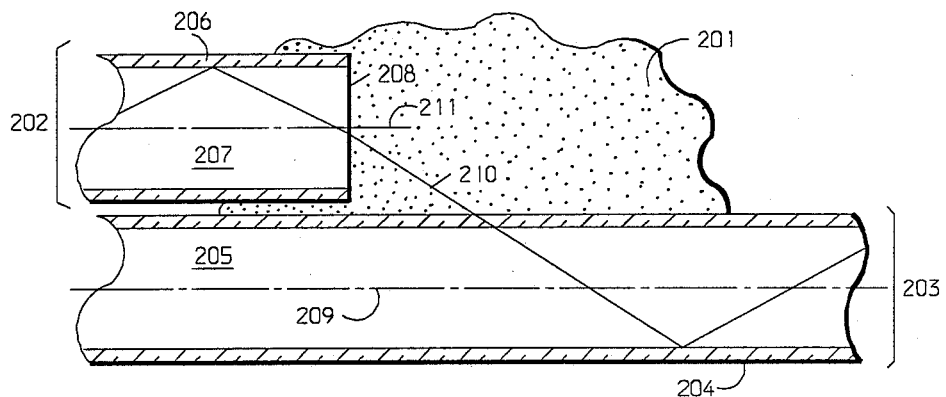
FIG. 2 illustrates a longitudinal cross-section view of the optical fiber coupler of the present invention wherein the tap optical fiber and the optical fiber bus are in a parallel relationship.

FIG. 2 illustrates a longitudinal cross-section view of a second embodiment of the optical fiber coupler of the present invention wherein tap fiber 202 and optical fiber bus 203 are parallel to each other as illustrated by center lines 211 and 209 being in a parallel plane. The advantages of this arrangement are that angular alignments is simplified, the taps can be more compact, and only higher order modes are launched into optical bus fiber 203 from tap fiber 202. The index of refraction for elements 201, 204, 205, 206 and 207 is similar to that for elements 101, 104, 105, 106, and 107, respectively, of FIG. 1.

Figure 3:
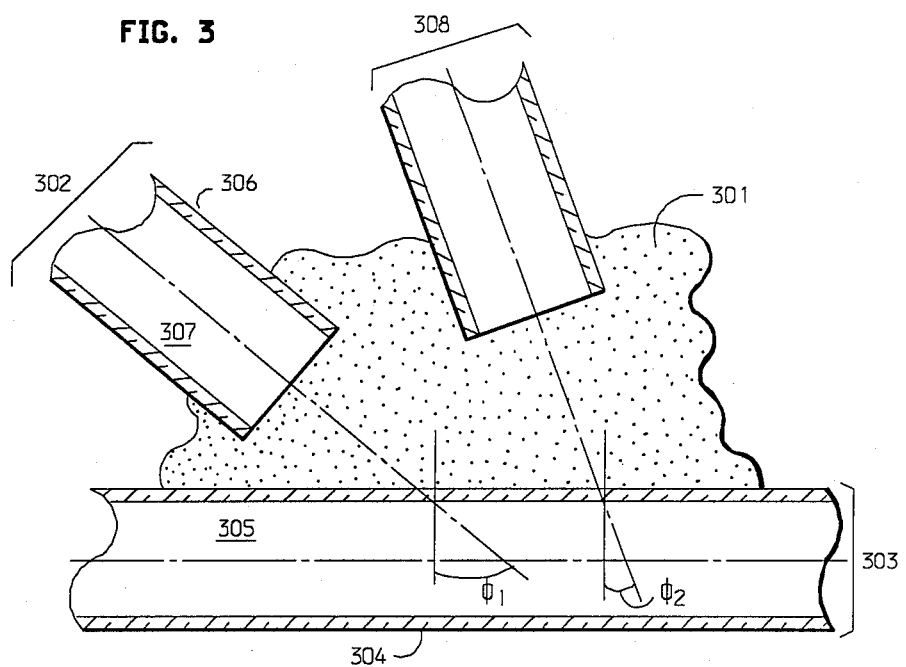
FIG. 3 illustrates a longitudinal cross-section view of a third embodiment of the optical fiber coupler of the present invention.

FIG. 3 illustrates a longitudinal cross-section view of a third embodiment of the optical fiber coupler of the present invention. This third embodiment illustrates that two optical tap fibers can be launching light at a single point into optical fiber bus 303. The two tap fibers are 302 and 308. Good light coupling will be achieved from tap fibers 302 and 308 as long as $\phi_1$ and $\phi_2$ are greater than the complement of the acceptance cone of optical bus fiber 303. The cladding and the core of tap fiber 308 are similar to cladding 306 and core 307 of tap fiber 302. Elements 301, 304, 305, 306, and 307 illustratively have a similar index of refraction as elements 101, 104, 105, 106, and 107, respectively, of FIG. 1.

Figure 4:
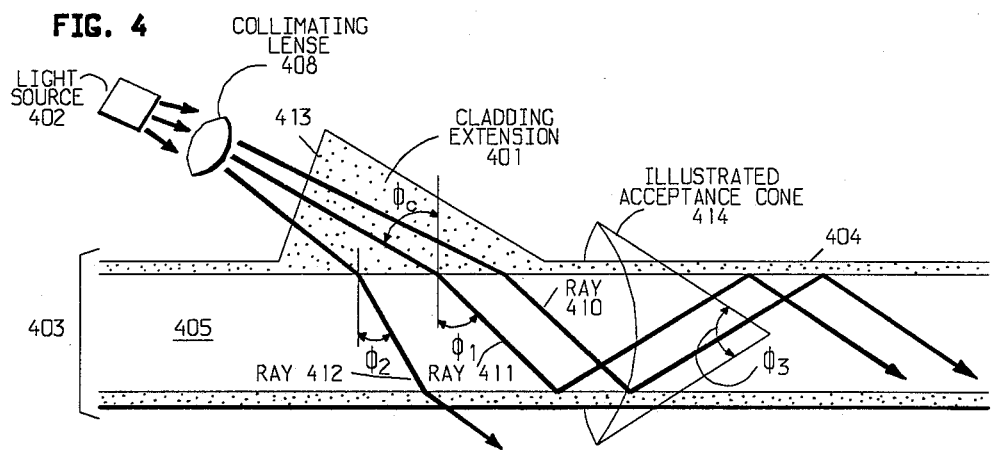
FIG. 4 illustrates a longitudinal cross-section view of a fourth embodiment of the optical fiber coupler of the present invention.

FIG. 4 illustrates a longitudinal cross-section view of a fourth embodiment of the optical fiber coupler of the present invention. Optical fiber bus 403 may advantageously be a square cross-section waveguide, manufactured by Dow Chemical Corporation, having an index of refraction of 1.59 consisting of polystyrene material. Cladding 404 of optical fiber bus 403 may advantageously be PMMA which has an index of refraction of 1.49. Cladding 404 extends into cladding extension 401 and is formed out of the same material as cladding 404.

Light is launched into optical fiber bus 403 from light source 402 after being collimated by leans 408. Face 413 of cladding extension 401 is parallel to lens 408. The collimated light passes through cladding extension 401 into core 405. Rays 410, 411, and 412 are illustrated as passing through cladding extension 401. Rays 410 and 411 are launched into core 405 because their angle is greater than the critical angle. Ray 412 is not launched into core 405 and becomes a cladding mode ray because its angle $\phi_2$ is less than $\phi_c$. Ray 412 will be lost through the cladding on the bottom of optical bus 403. The acceptance cone 414 is shown in FIG. 4 to illustrate the acceptance angle $\phi_3$. The cone is shown for illustration purposes. The acceptance cone is defined as $$\phi_3 = 2 \sin^{-1}(n_1 - n_2) \quad (5)$$

where $n_1$ and $n_2$ are the same as in equation 1.

Figure 5:
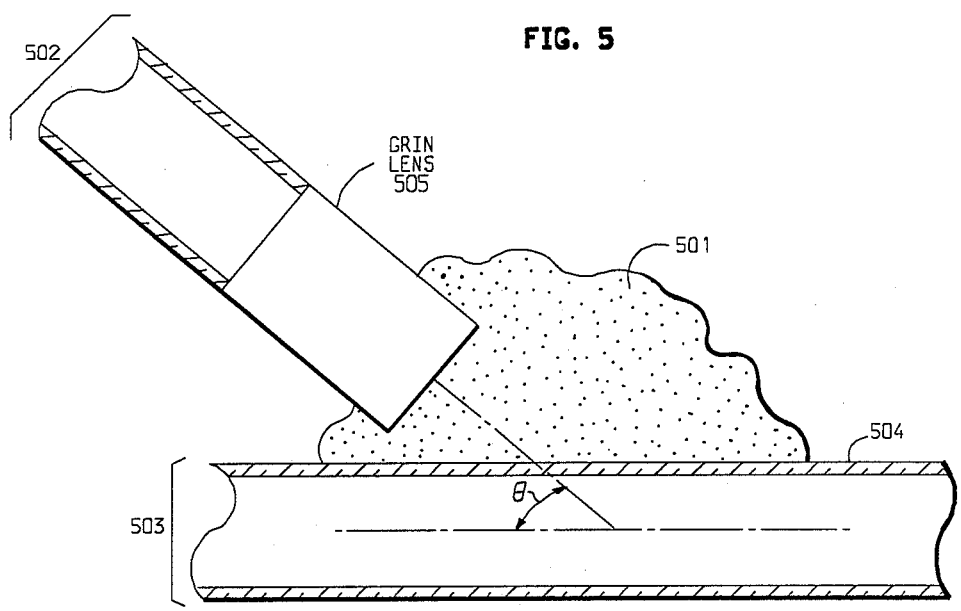
FIG. 5 illustrates a longitudinal cross-section view of a fifth embodiment of the optical fiber coupler of the present invention.

FIG. 5 illustrates a longitudinal cross-section view of a fifth embodiment of the optical fiber coupler of the present invention. FIG. 5 is similar to FIG. 4 except that lens 408 is replaced by a nominally quarter pitch GRIN lens 505 and cladding extension 401 is replaced by junction media 501. The center of GRIN lens 505, junction media 501 and cladding 504 each may advantageously have the same or significantly similar indices of refraction. The utilization of GRIN lens 505 allows these indices of refraction to be matched with greater ease.

Figure 6:
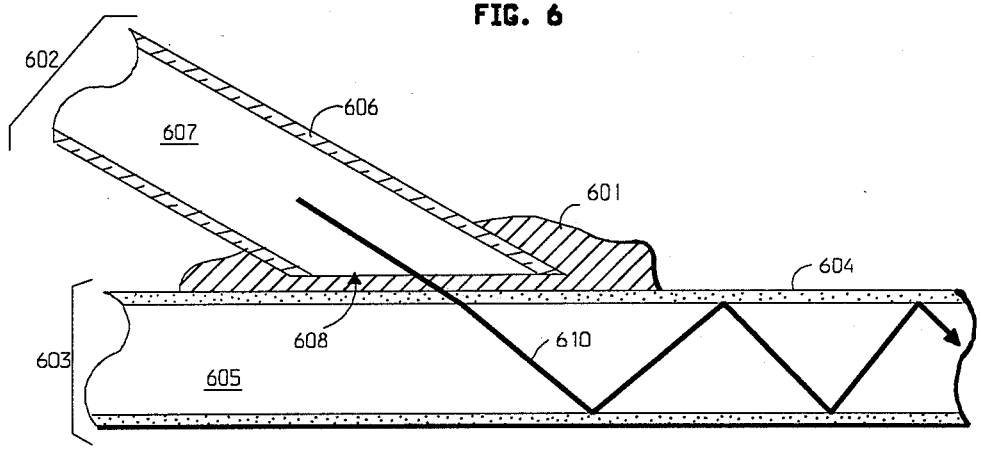
FIG. 6 illustrates a longitudinal cross-section view of a sixth embodiment of the optical fiber coupler of the present invention.

FIG. 6 illustrates a longitudinal cross-section view of a sixth embodiment of the optical fiber coupler of the present invention. Optical waveguide bus 603 is a square cross-section waveguide which advantageously may be manufactured by the Dow Chemical Corporation. Advantageously, the index of refraction of core 607, junction media 601, and cladding 604 are substantially similar which, advantageously, means that the difference between each index of refraction is equal to or less than 0.1. Advantageously, core 607 may be made from PMMA, cladding 606 may be made from fluoropolymer, junction media 601 may be Electro-Lite ELC4481 methacrylate adhesive, core 605 may be polystyrene, and cladding 604 may also be PMMA. End-face 608 of tap fiber 602 is shaped so as to be positioned directly on cladding 604 separated only by a thin layer of junction material 601. By shaping end-face 608 in this manner, a large number of modes are launched into core 605.

While specific embodiments of the invention have been disclosed, variations in structural detail, within the scope of the appended claims, are possible and are contemplated. In particular, graded index fiber could be utilized in place of the step index fiber illustrated in FIGS. 1 through 6. Various geometric cross-sectional fiber shapes could be utilized in FIGS. 1 through 6. There is no intention of limitation to what is contained in the abstract or the exact disclosure as herein presented. The above-described arrangements are only illustrative of the application of the principles of the invention. Other arrangements may be devised by those skilled in the art without departing from the spirit and the scope of the invention.

I claim:

1. An optical fiber coupler comprising:
a length of an optical fiber bus having a core and cladding and a straight region with cladding substantially similar to the cladding of the remainder of the optical fiber bus;
at least one tap optical fiber having a free end and a core-exposing face thereon, said free end of said tap optical fiber being adjacent to said optical fiber bus with the face of said free end facing said optical fiber bus region, the axes of said tap optical fiber and said optical fiber bus being positioned to permit light communication between said tap optical fiber and said optical fiber bus; and
a junction media encapsulating said tap optical fiber free end and said optical fiber bus region, said junction media having substantially the same refractive index as said cladding, thereby allowing efficient transmission of light from said tap optical fiber free end face into said optical fiber bus via said optical fiber bus cladding.

2. The coupler of claim 1 wherein said junction media is rigid and wherein said junction media further fixes said tap optical fiber and said optical fiber bus in position.

3. The coupler of claim 1 wherein the maximum included angle between said tap optical fiber free end axis and said optical fiber bus region is no greater than the sum of the maximum optical fiber bus acceptance angle and the maximum tap fiber acceptance angle.

4. The coupler of claim 1 wherein the axes of said tap optical fiber free end and said optical fiber bus region are parallel thereby only coupling upper light modes into said optical fiber bus.

5. The coupler of claim 1 wherein the difference between said refractive index of said junction media and the refractive index of said optical fiber bus cladding is equal to or less than about 0.1.

6. An optical fiber coupler comprising:
a length of an optical fiber bus having a core and cladding a region with cladding;
said cladding in said region comprising a cladding extension having a side face; and
said side face being responsive to receipt of light for coupling said light into said optical fiber bus via said cladding.

7. The coupler of claim 6 further comprising a light signal source for generating light signals;
a lens for collimating said light signals to produce said light; and
said lens positioned parallel to said side face.

8. The coupler of claim 6 wherein said optical fiber bus is a square fiber and said cladding extension positioned horizontally on one face of said optical fiber bus.

9. An optical fiber coupler comprising:
a length of an optical fiber bus having a core and cladding a straight region with cladding substantially similar to the cladding of the remainder of the optical bus;
at least one tap optical fiber having a free end and a core-exposing face thereon;
a lens attached to said free end;
said lens being adjacent to said optical fiber bus with a face of said lens facing said optical fiber bus region, the axes of said tap optical fiber and said optical fiber bus being positioned to permit light communication between said tap optical fiber and said optical fiber bus; and
a junction media encapsulating said lens and said optical fiber bus region, said junction media having substantially the same refractive index as said cladding thereby allowing efficient transmission of light from said lens into said optical fiber bus via said optical fiber bus cladding.

10. The coupler of claim 9 wherein said lens is a GRIN type lens.

11. The coupler of claim 10 where the refractive index of said GRIN type lens is substantially the same as that of said junction media.

12. An optical fiber coupler comprising:
a length of an optical fiber bus having a core and cladding a straight region with cladding substantially similar to the cladding of the remainder of the optical bus;
at least one tap optical fiber having a free end and a core-exposing face thereon, said free end of said tap optical fiber being cleaved at an angle to said tap optical fiber;
said optical fiber bus being a square fiber;
the axes of said tap optical fiber and said optical fiber bus being positioned to permit light communication between said tap optical fiber and said optical fiber bus and the face of said free end being horizontal with a side of said optical fiber bus region; and a junction media between said tap optical fiber free end face and said optical fiber bus region.

13. The coupler of claim 12 wherein said junction media has substantially the same refractive index as said cladding thereby allowing efficient transmissin of light from said tap optical fiber free end face into said optical fiber bus via said optical fiber bus cladding.

14. The coupler of claim 13 wherein the difference between said refractive index of said junction media and the refractive index of said optical fiber bus cladding is equal to or less than about 0.01.

15. The coupler of claim 14 wherein the refractive index of the core of said tap optical fiber is substantially the same as said refractive index of said junction media.

* * * * *